(12) United States Patent
Condorelli et al.

(10) Patent No.: US 7,516,246 B2
(45) Date of Patent: Apr. 7, 2009

(54) COMMUNICATIONS CHANNEL METHOD FOR VERIFYING INTEGRITY OF UNTRUSTED SUBSYSTEM RESPONSES TO A REQUEST

(75) Inventors: Vincenzo Condorelli, Poughkeepsie, NY (US); Thomas J. Dewkett, Staatsburgh, NY (US); Michael D. Hocker, Staatsburg, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/260,285

(22) Filed: Oct. 27, 2005

(65) Prior Publication Data

US 2007/0162621 A1 Jul. 12, 2007

(51) Int. Cl.
*G06F 3/00* (2006.01)
*G06F 11/00* (2006.01)
(52) U.S. Cl. .............................. 710/15; 714/48; 714/52
(58) Field of Classification Search .................. 710/1, 710/15, 268; 714/8, 723
See application file for complete search history.

(56) References Cited

U.S. PATENT DOCUMENTS

| | | | | |
|---|---|---|---|---|
| 5,421,006 A | * | 5/1995 | Jablon et al. | 714/36 |
| 5,539,879 A | * | 7/1996 | Pearce et al. | 714/47 |
| 5,649,089 A | * | 7/1997 | Kilner | 714/6 |
| 5,765,172 A | * | 6/1998 | Fox | 707/204 |
| 5,778,206 A | * | 7/1998 | Pain et al. | 710/305 |
| 5,953,352 A | * | 9/1999 | Meyer | 714/820 |
| 5,991,774 A | * | 11/1999 | Tate et al. | 707/203 |
| 6,088,330 A | | 7/2000 | Bruck et al. | 370/228 |
| 6,668,352 B1 | | 12/2003 | Jung | 714/800 |
| 6,674,715 B1 | | 1/2004 | Yamada | 370/220 |

(Continued)

FOREIGN PATENT DOCUMENTS

JP 2004-120190 4/2004

(Continued)

OTHER PUBLICATIONS

"Diagnostic Wrap Using Cyclic Redundancy Checking," J.C. Elliot, IBM Technical Disclosure Bulletin, vol. 20, No. 3, Aug. 1977, p. 1041.

(Continued)

*Primary Examiner*—Henry W. H. Tsai
*Assistant Examiner*—Michael Sun
(74) *Attorney, Agent, or Firm*—Joseph Biela, Esq.; Kevin P. Radigan, Esq.; Heslin Rothenberg Farley & Mesiti, P.C.

(57) ABSTRACT

In a communications channel coupled to multiple duplicated subsystems, a method, interposer and program product are provided for verifying integrity of subsystem responses. Within the communications channel, a first checksum is calculated with receipt of a first response from a first subsystem responsive to a common request, and a second checksum is calculated for a second response of a second subsystem received responsive to the common request. The first checksum and the second checksum are compared, and if matching, only one of the first response and the second response is forwarded from the communications channel as the response to the common request, with the other of the first response and the second response being discarded by the communications channel.

10 Claims, 5 Drawing Sheets

U.S. PATENT DOCUMENTS

| | | | |
|---|---|---|---|
| 7,231,564 B2 * | 6/2007 | Loaiza et al. | 714/723 |
| 7,293,044 B2 * | 11/2007 | Ghotge et al. | 707/200 |
| 2004/0042494 A1 * | 3/2004 | Chen et al. | 370/474 |
| 2004/0054956 A1 | 3/2004 | Byrd | 714/785 |
| 2004/0081087 A1 | 4/2004 | Shea | 370/228 |
| 2004/0100966 A1 | 5/2004 | Allen, Jr. et al. | 370/395.1 |
| 2006/0179483 A1 * | 8/2006 | Rozas | 726/22 |

FOREIGN PATENT DOCUMENTS

| | | |
|---|---|---|
| KR | 2002033227 A | 5/2002 |

OTHER PUBLICATIONS

"Logic Redundancy Cross Checking For Memory," IBM Technical Disclosure Bulletin, vol. 33, No. 10B, Mar. 1991, pp. 147-148.

"Embedding a secondary communication channel transparently within a cyclic redundancy check (CRC)," D. R. Irvin, IBM Res. & Dev., vol. 45, No. 6, Nov. 2001, pp. 789-796.

* cited by examiner fig. 1 fig. 2 fig. 3 fig. 4

COMMUNICATIONS CHANNEL METHOD FOR VERIFYING INTEGRITY OF UNTRUSTED SUBSYSTEM RESPONSES TO A REQUEST

TECHNICAL FIELD

This invention relates in general to delivery of error-free results from an untrusted subsystem responsive to a request, and more particularly, to a communications channel interposer, method and program product for verifying integrity of responses received to a common request from duplicated, non-error-free subsystems coupled to the communications channel.

BACKGROUND OF THE INVENTION

In high availability computing environments, it is sometimes desirable for error detection to compare responses from two independent, duplicated subsystems performing the same computation tasks. This goal is typically achieved in a relatively simple way by running the two independent subsystems in lockstep, or more generally, guaranteeing that the answers outputted by the two subsystems have the same order. In the case of multi-task processing subsystems performing computing-intensive operations, however, it can be difficult to guarantee the completion order of each task using a lockstep method.

Thus, presented herein is an approach to resolving the problem of comparing the output of two independent subsystems independent from their order.

SUMMARY OF THE INVENTION

The shortcomings of the prior art are overcome and additional advantages are provided through the provision of a method of verifying integrity of subsystem responses. The method includes: receiving a first response at a communications channel from a first subsystem of at least two duplicated subsystems, the first response being responsive to a common request sent to each subsystem of the at least two duplicated subsystems, and wherein the at least two duplicated subsystems output responses to the communications channel; determining, within the communications channel, a first checksum for the first response of the first subsystem; receiving a second response at the communications channel from a second subsystem of the at least two duplicated subsystems responsive to the common request; determining a second checksum for the second response of the second subsystem of the at least two duplicated subsystems; and comparing the first checksum and the second checksum, and if matching, forwarding only one of the first response and the second response from the communications channel as the response to the common request.

In another aspect, a system for verifying integrity of subsystem responses is provided. The system includes an interposer disposed at a communications channel coupled to at least two duplicated subsystems. The interposer includes an input dispatcher, a checksum generator, memory, a checksum verifier and a multiplex controller. The input dispatcher provides a common request in parallel to the at least two duplicated subsystems. The checksum generator generates a first checksum from a first response of a first subsystem of the at least two duplicated subsystems received responsive to the common request, and a second checksum from a second response from a second subsystem of the at least two duplicated subsystems received responsive to the common request. The memory temporarily stores the first checksum until receipt of the second response. The checksum verifier compares the first checksum and the second checksum, and if matching, outputs a matching control signal to the multiplex controller. The multiplex controller, responsive to the matching control signal output from the checksum verifier, outputs only one of the first response and the second response from the communications channel as the response to the common request.

In a further aspect, at least one program storage device readable by a computer, tangibly embodying at least one program of instructions executable by the computer is provided to perform a method of verifying integrity of subsystem responses. The method includes: receiving a first response at a communications channel from a first subsystem of at least two duplicated subsystems, the first response being responsive to a common request sent to each subsystem of the at least two duplicated subsystems, and wherein the at least two duplicated subsystems output responses to the communications channel; determining, within the communications channel, a first checksum for the first response of the first subsystem; receiving a second response at the communications channel from a second subsystem of the at least two duplicated subsystems responsive to the common request; determining a second checksum for the second response of the second subsystem of the at least two duplicated subsystems; and comparing the first checksum and the second checksum, and if matching, forwarding only one of the first response and the second response from the communications channel as the response to the common request.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a communications channel implemented facility for cross-checking responses from two or more independent; subsystems performing the same tasks, but with not necessarily in an identical completion order. The approach is particularly advantageous in cases where the average processing time of each task is significantly greater than the latency introduced between the independent subsystems, for example, for a latency varying from a few to several clock cycles. As used herein, the term "subsystem" refers to any system, logic, function, processing block, etc., implemented in hardware, software and/or firmware, and which provides a response to a request. Further, a "checksum" means any checksum, signature, CRC value, etc., derived from a result output from a subsystem of the multiple independent subsystems. In the examples discussed, it is assumed that the duplicated subsystem is an untrusted (i.e., non-error-free) subsystem, that is, a subsystem which may be susceptible to soft or transient errors occurring in the output response. Many commercially available subsystems are non-error-free subsystems (i.e., non-error checking systems) susceptible to occurrence of such errors, for example, resulting from bombardment of the subsystem by one or more alpha particles.

Figure 1:
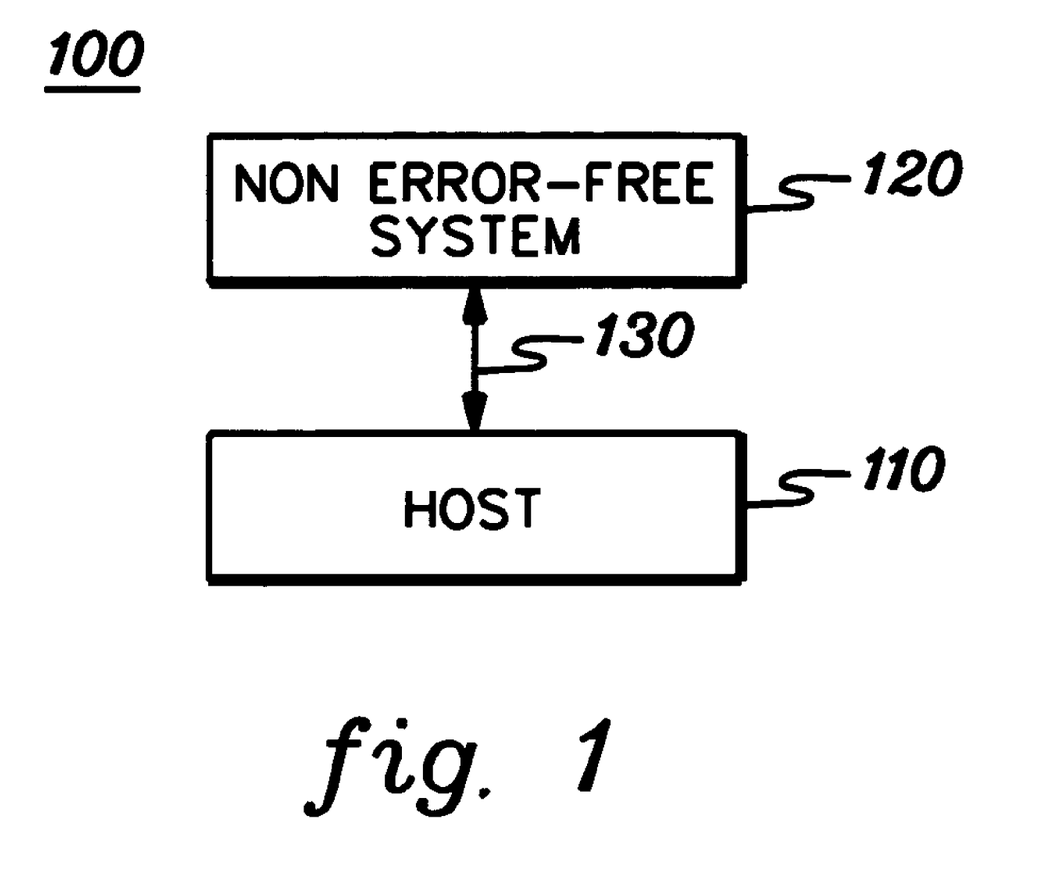
FIG. 1 is a simple diagram of a computing environment where a host is coupled to a non-error-free system via a communications channel.

FIG. 1 depicts one embodiment of a computing environment 100, wherein a host computer 110 is coupled to a single non-error-free system 120 via a communications channel or bus 130. In this environment, should a transient error occur in the response output from system 120, host 110 has no ability to discern the existence of the error. Thus, such a computing environment configuration would be unsuited to a high availability computing environment.

Figure 2:
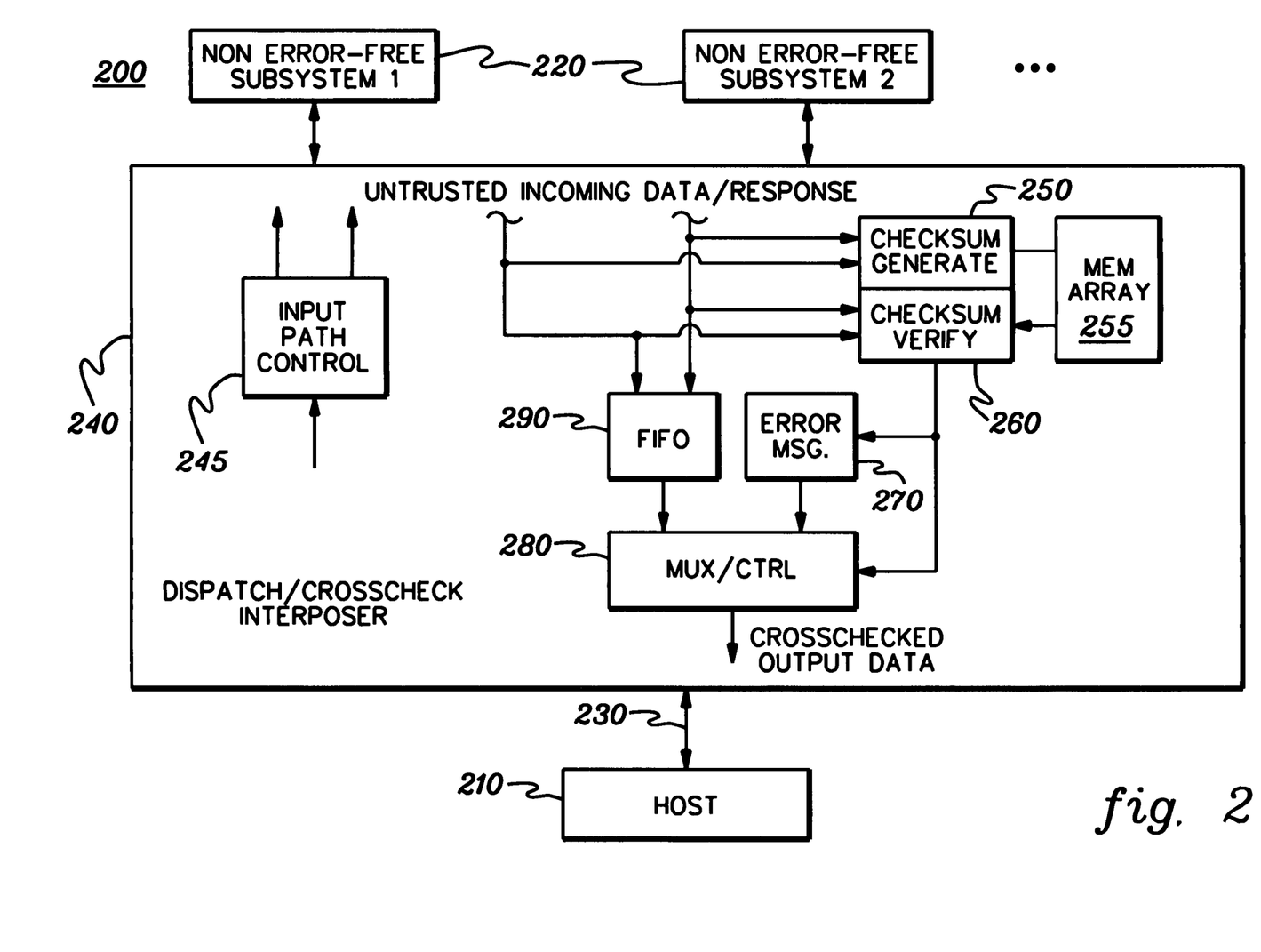
FIG. 2 depicts one embodiment of a communications channel coupling at least two duplicated subsystems and a host, and implementing a dispatch/crosscheck interposer, in accordance with an aspect of the present invention.

FIG. 2 depicts one embodiment of a computing environment 200, in accordance with an aspect of the present invention. In this embodiment, multiple independent, duplicated (and individually not error-free) subsystems 220 provide data to external applications (for example, running on a host 210) through a single communications channel 230. In accordance with an aspect of the present invention, an interposer 240 (such as a communications adapter) is provided within or in association with the communications channel to transparently verify integrity of responses received to a request, for example, from host 210. This request can be transparently forwarded in parallel by input path control logic 245 within interposer 240 (along with a request operation identifier) to each independent, duplicated subsystem 220 as a common request. The data source subsystems 220 independently react to the identical input (i.e., request). The two or more duplicated subsystems are expected to generate the same response or result from the identical request in the absence of an error. The request operation identifier can either arrive with a user's request or can be transparently generated by interposer 240 and associated with a common request forwarded in parallel to the duplicated subsystems. Further, a single bit in the request header received from a user can be employed to signify whether the response to the request is to undergo cross-checking as disclosed herein.

Each input request is assumed to generate a response from each subsystem, and exactly one, error-free copy of each response is to be delivered to the requesting application (i.e., requestor) through the integrity-verifying communications channel. The channel/interposer recognizes if responses to the same input are identical, by matching request operation identifiers and calculating a characteristic checksum of the first response in a checksum generator 250, and verifying that all subsequent responses have the same checksum via a checksum verifier 260. The first checksum can be temporarily stored in a memory array 255 associated with interposer 240. If there are differences between subsequent responses to the same input request, then the interposer indicates an error condition (data mismatch) to the external application. This error message 270 can be sent, via a control signal generated by checksum verifier 260, through a multiplex controller 280 for return as the output responsive to the request generated by host 210. If all responses to the same request are identical, then the interposer identifies successful completion to the verification by outputting, for example, the second response received from the second responding subsystem 220 as the response to the common request received from host 210. This can be achieved by buffering the second response in a FIFO 290 within the interposer pending verification of the checksums. In one application described below, the first response from a first responding subsystem 220 is discarded after generation of a first checksum corresponding to the first response. Thus, in accordance with an aspect of the present invention, only one response from the two or more duplicated subsystems needs to be buffered in the interposer pending verification of the response for forwarding to the requester. All other responses may be discarded.

As a special case, the interposer may manage requests where responses may contain variations, returning a unique response to the requesting application. Assuming that all responses are generated on identical mechanisms (i.e., subsystems), then the responses should be statistically equivalent, and returning only one (selected randomly), is logically equivalent to a result from a single responder.

Figure 3:
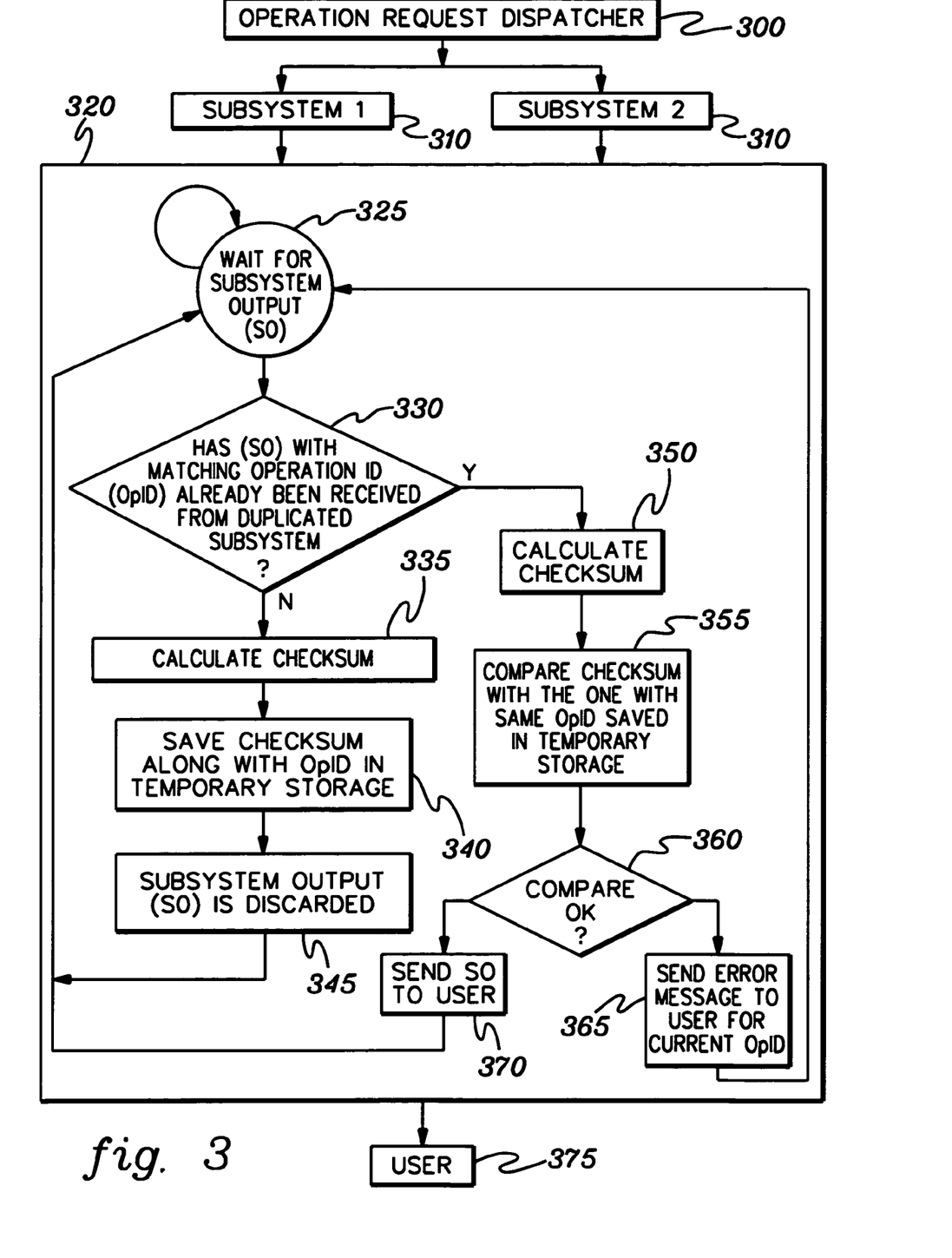
FIG. 3 is a flowchart of one embodiment of interposer processing for verifying integrity of responses from at least two parallel-connected, duplicated subsystems running asynchronously, in accordance with an aspect of the present invention.

FIG. 3 is a flowchart of one embodiment of processing implemented by a communications channel interposer, in accordance with an aspect of the present invention. A dispatcher dispatches 300 an identical or common request (and request operation identifier) to multiple duplicated subsystems 310, which in this example comprise two independent non-error-free subsystems running asynchronously. The interposer 320 within the communications channel waits for subsystem output 325 and when a response (or output) is received from a subsystem, the interposer determines whether the subsystem response has a matching operation identifier already received from one of the duplicated subsystems 330.

Assuming that this is the first response to the common request, then the interposer calculates a first checksum for the first response 335 and saves the first checksum along with the operation identifier for the request in temporary storage 340. The first response received as subsystem output is then discarded 345 and the interposer returns to a wait state 325. With receipt of a second response from a second subsystem 310, the interposer determines whether the second response has a matching operational identifier already received from a duplicated subsystem 330. If this is the second response, then the answer is "yes", and the interposer verifies that the checksums are identical by initially calculating a second checksum for the second response 350 and then, identifying the first checksum via the operation identifier saved in temporary storage and, comparing the first checksum and the second checksum 355. Assuming that there is a mismatch 360, then an error message is sent to the user (or requestor) initiating the request for the current operation identifier 365. Otherwise, only the second response is sent as the response 370 to the user 375 initiating the request.

In an alternate implementation, at least three duplicated subsystems can communicate with an integrity-verifying communications channel as proposed herein. In such an implementation, the subsystems response to the common request is sent to the user/requestor as soon as two subsystems provide an identical response. In normal operation, the responses from the first two subsystems will match, and the response from the third subsystem is employed to send a warning only if the third subsystem response differs from the first two subsystems. In the case where the output from the first two subsystems mismatch, then the interposer waits for the third response before sending to the user the response to the common request (i.e., if at least two responses match), and determines which subsystem if failing. If all the subsystems output different responses, then a severe error situation is encountered where two of the three subsystems are necessarily failing. Depending upon the error recovery approach, the failing subsystem(s) may be taken offline or replaced.

Figure 4:
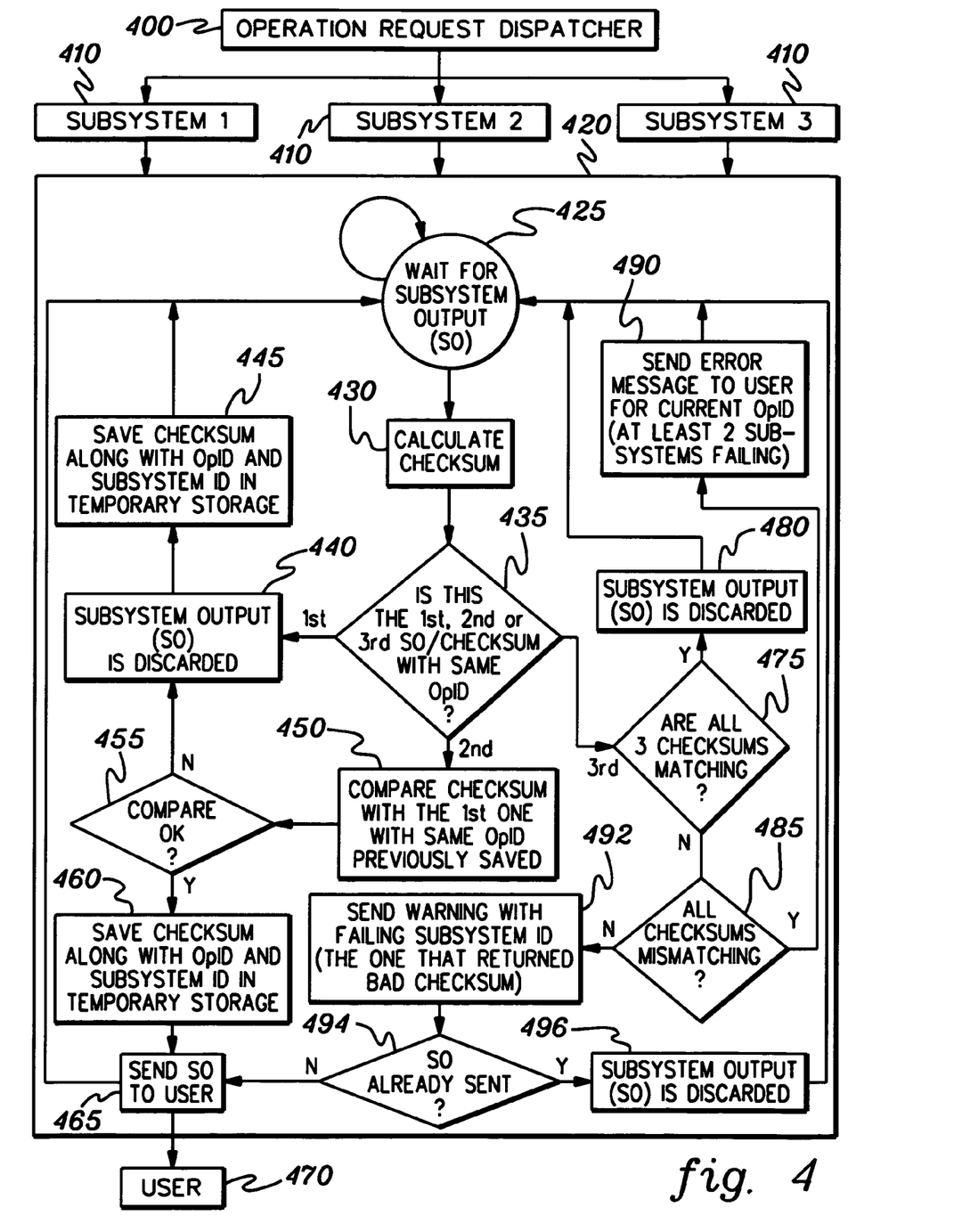
FIG. 4 is a flowchart of an alternate embodiment of interposer processing for verifying integrity of responses from three parallel-connected, duplicated subsystems running asynchronously, in accordance with an aspect of the present invention.

FIG. 4 depicts one embodiment of this alternate interposer processing in accordance with an aspect of the present invention. In this embodiment, three independent subsystems 410 are duplicated and receive in parallel a common request (and operation identifier) from a dispatcher 400. The subsystems are coupled to a common communications channel which has an interposer 420 implemented therein for verifying integrity of the responses received from the subsystems. Interposer 420 waits for a subsystem output or response 425.

Upon receipt of a first response from one subsystem 410, the interposer calculates a first checksum 430, and determines whether this response is the first, second or third response/checksum with the same operation identifier 435. Assuming that this is the first checksum, then the interposer discards the first response 440 and saves the first checksum along with the request operation identifier (OpID) and subsystem identifier (ID) in temporary storage 445 associated with interposer 420. Thereafter, upon receipt of a second response, a second checksum is calculated 430, and the interposer determines that this is the second response/second checksum with the same request operation identifier 435. In this case, the first and second checksum with the same operation identifier are compared 450 and if the comparison matches 455, then the second checksum, the request operation identifier and subsystem ID of the second responding subsystem are saved in temporary storage 460, and the second response is output as the response to the common request 465 to the requesting user 470. Once the second response is output, the interposer returns to wait state to await the third response from the third subsystem 410. Upon receipt of the third response, a third checksum is calculated 430, and the interposer confirms that this is the third response/third checksum with the same request operation identifier 435. If so, then all checksums are compared to confirm that all checksums match 475. Assuming that the checksums match, then the third response from the third responding subsystem is discarded 480, and the interposer returns to wait for a next subsystem output.

If all checksums do not match, then the interposer determines whether all checksums are mismatching 485, and if so, an error message is sent to the user of the current operation identified request that at least two subsystems of the independent duplicated subsystems are failing 490. If all checksums are not mismatching, then a warning is sent with the failing subsystem identifier 492, and the interposer determines whether the response to the common request has already been sent 494. If so, then the third response of the third responding subsystem is discarded 496, otherwise, the third response is output as the response to the user initiating the request 465.

Figure 5:
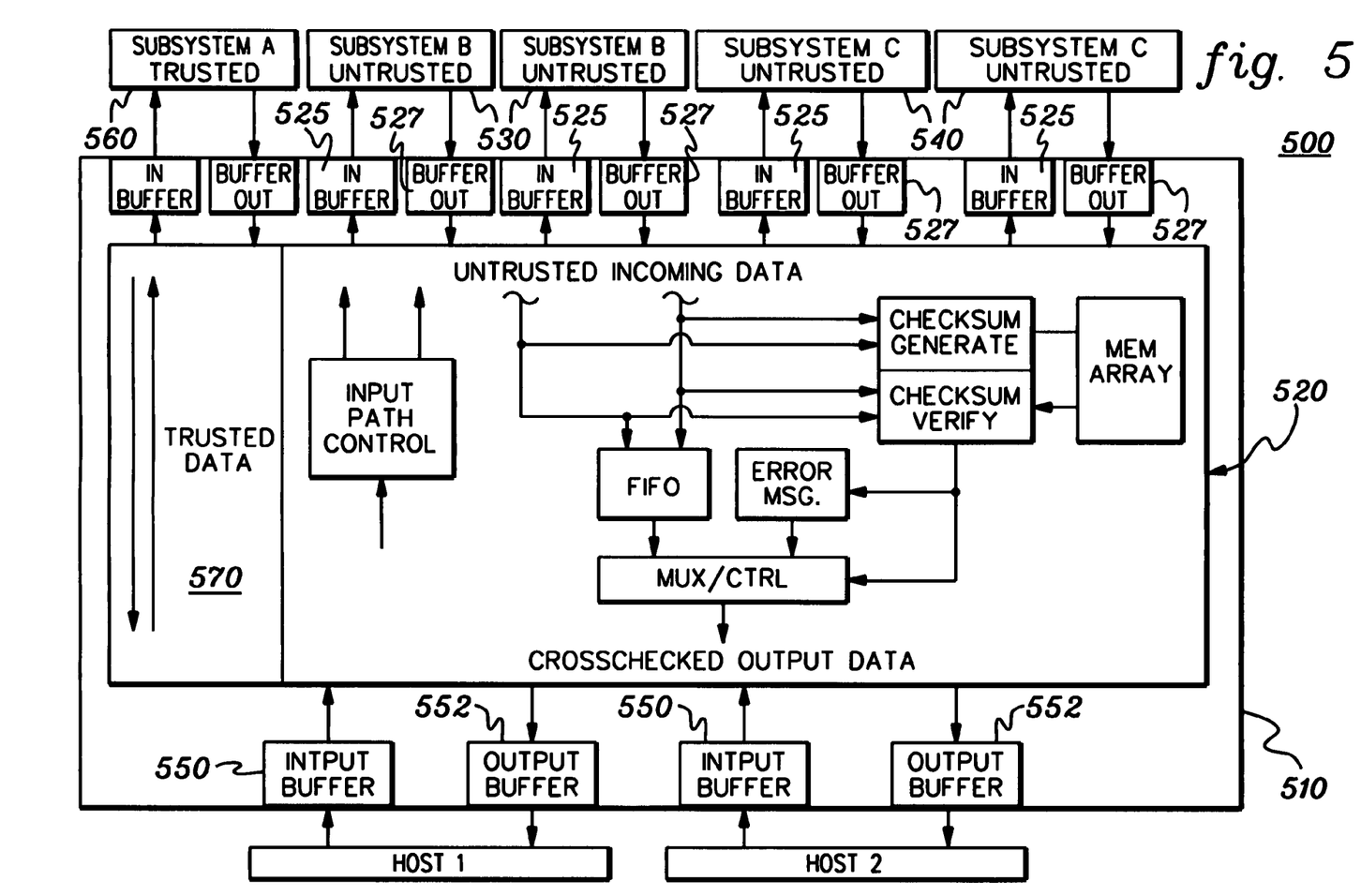
FIG. 5 is a schematic of an alternate embodiment of a communications channel with a dispatch/crosscheck interposer, in accordance with an aspect of the present invention.

FIG. 5 depicts an alternate embodiment of a computing environment 500, wherein a communications channel 510 includes an interposer 520 which transparently verifies integrity of selected responses from a first set of duplicated, untrusted subsystems 530 and a second set of duplicated, untrusted subsystems 540. Operation of interposer 520 is similar to interposer 240 described above in connection with FIG. 2. As shown, interposer 520 is coupled via an input buffer 525 and output buffer 527 with each untrusted subsystem 530, 540 and is coupled via input buffers 550 and output buffers 552 with one or more external requestors (i.e., hosts, users or applications). As shown, communications channel 570 directly forwards trusted data from trusted subsystem A 560 to an initiating requestor without undergoing any integrity checking. Trusted data, by definition, means that the data has already undergone error checking.

To summarize, an error detection mechanism or interposer such as described herein advantageously inspects responses and selects one response for delivery to a requesting application. The independently generated responses from duplicated, non-error-free subsystems, are verified within the communications channel. A first received response is used to calculate a representative checksum, which is stored in the channel's internal memory or "response contents" queue. This queue contains the checksums of previously delivered responses, indexed by request unique identifiers (referred to herein as request operation identifiers). After calculating the checksum, the first response is discarded. As other subsystems submit their independently generated, asynchronously arriving responses to the channel subsequently, the channel verifies that each checksum matches that of the first response. Specifically, when the second response is submitted to the channel, its checksum is matched to that of the first checksum in the response contents queue. If a mismatch is detected, then the requestor application is notified of a data mismatch. Since there has been no response or data delivered so far, then no further action is necessary. If the second response checksum matches that of the first checksum, then the data is assumed to be identical, and the second response is delivered to the requestor application as the response to the request. If more than two data subsystems are coupled in parallel, then the availability of the response is not indicated to the requestor until all responses have been verified, even if the second response gets copied to the application. This could be achieved by delaying delivery of integrity confirmation to the requester until the last response is verified.

Once the last response has been detected and verified, the request identifiers and response checksums corresponding thereto may be removed from the checksum queue (i.e., interposer memory), since no more responses are expected for that request.

In one embodiment, the system may support timeouts, indicating a timeout to the requestor if any of the subsystems times out.

To accommodate requests where responses are not entirely deterministic, the channel may recognize such request types as special cases, e.g., through the use of a request header bit. In such a case, the channel may deliver the first response to the requestor application, and discard subsequently arriving responses. In this case, the relative ordering of responses becomes relevant, since the requestor won't be notified of all responses. An alternative implementation is for the channel, upon detection of such a request, to submit the request to only one subsystem and have the associated answer or response bypass the interposer's error checking facility. The proposed solution does not provide error-detection for such non-deterministic cases. Note that error-detection of such non-deterministic responses is an application-level problem, and may not be possible to detect in the communications channel.

Responses provided to the outside application may be considered error-free, without multiplying transfer requirements, which would be the case if the outside device would have to verify that entire responses match. Since at most one copy of each response is delivered by the channel, applications can interface to the error-free channel system described herein almost exactly as they would to a single-source, error-prone one. The only difference is that a new error condition, "data mismatch", may have to be added to the application (and optionally a means for recognition of a non-deterministic application request/response). Since this error may also be treated similarly to a timeout, preparing applications to interface to an error-free channel is much less different from a non-error-free case than, for example, delegating mismatch detection to the external application.

Note that the proposed system does not require synchronization of the duplicated subsystems ("cross-checking"). The duplicated subsystems work completely independently of each other, requiring no changes from the non-duplicated case. Apart from interfacing the channel to each duplicated subsystem, the communications channel does not have to provide additional services, compared to the non-duplicated case (such as cross-checking would mandate).

Since the communications channel matches responses in its internal queue, external applications do not have to perform further checks on data retrieved from the channel. This implies that existing applications can continue to be used in the new, error-free channel environment without modifications, even if they were previously adapted to error-prone channels. The only observable difference will be the lack of erroneous data from the channel, which is replaced by exceptions indicating data mismatch. All higher-level functionality, such as protocol-level error checking, is identical in the present system and a non-duplicated, non-error-free implementation.

The present invention identifies responses corresponding to the same request through request-specific unique identifiers. Such request-unique identifiers, which can be copied to the responses, are a feature of contemporary communications systems. Therefore, this requirement does not introduce additional overhead. Note that request identifiers are not required to be globally unique; the only requirement is that the identifiers are not reused in the time frame defined by the depth of the channel checksum storages. (Contemporary communications systems, with sufficiently sized identifiers, will satisfy this requirement.) If the channel checksum queue can hold the n last recently encountered requests, request identifiers should not be reused until m>>n requests have been processed. If successfully matched requests are removed from the checksum queue, this requirement may be relaxed, but since n is assumed to be very small compared to the number of possible unique request identifiers, such a change should not alter the m>>n requirement considerably.

Since the communications channel is shared between subsystems, data (i.e., responses) passed to applications enters the communications channel in a serialized fashion. (This is not a new requirement over those of a shared channel, since responder arbitration must be handled at channel entry for shared channels.) As individual responses are merged to the same communications channel, the proposed solution permits the checksum-generating and verifying module to operate in a strictly serialized fashion, where the responses have an unambiguous arrival order for the purposed checking. (Note that the arrival order is unique, due to serialization, but not necessarily deterministic.) Such serialized processing is easier to implement than attempting to detect mismatches between requests in completely independent, parallel response channels. In the present invention, there is no possibility of synchronization problems once the response data has entered the channel.

To accommodate requests where responses are not deterministic, the channel permits the application or subsystems to indicate non-replicateable responses. Examples would be algorithms involving randomness, or other cases where non-cooperating subsystems are expected to generate different responses to the same response. Such non-reproduceable answers are handled without correction (to the requestor application, they behave as they would in a non-error-free system), but their integrity is not guaranteed.

Since response contents are matched to each other through a checksum, only a limited amount of additional channel storage is required, defined by the maximum number of outstanding requests. The intermediate storage requirement is independent of total request size (and therefore channel bandwidth) and only depends on the size of the checksum, the number of outstanding requests, and overhead. Matching responses through checksums is an improvement over solutions where both responses are fetched and matched in parallel paths of the channel device, where the channel requirement depends on the total request size. Compared to this case, systems implementing the present invention have the advantage that the worst-case intermediate storage requirement is fixed.

The detailed description presented above is discussed in part in terms of program procedures executed on a computer or network of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

The invention is preferably implemented in a high level procedural or object-oriented programming language to communicate with a computer. However, the invention can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such the electronic test equipment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of verifying integrity of subsystem responses, the method comprising:
   (i) receiving a first response at a communications channel from a first subsystem of at least two subsystems, the first response being responsive to a same, common request and operation identifier sent to each subsystem of the at least two subsystems, and wherein the at least two subsystems output responses to the same communications channel each response having associated therewith the operation identifier;
   (ii) determining, within the communications channel, a first checksum for the first response of the first subsystem using a checksum generator;
   (iii) receiving a second response at the communications channel from a second subsystem of the at least two subsystems responsive to the common request;
   (iv) determining, within the communications channel, a second checksum for the second response of the second subsystem of the at least two subsystems using the checksum generator;
   (v) associating the second checksum with the first checksum using the operation identifier of the common request; and
   (vi) comparing the first checksum and the second checksum, and if matching, forwarding only one of the first response and the second response from the communications channel as the response to the common request;
   wherein the first response and the second response are asynchronously received at the communications channel, with at least one other response to at least one other common request being received at the communications channel therebetween.

2. The method of claim 1, further comprising discarding the first response after calculating the first checksum and before receiving the second response, and wherein the forwarding comprises forwarding the second response of the second subsystem from the communications channel as the response to the common request when the first checksum and the second checksum match.

3. The method of claim 1, further comprising storing the first checksum in an internal memory of the communications channel until performing the comparing (vi), and wherein the determining (ii), the determining (iv), and the comparing (vi) are transparent to a requestor initiating the common request.

4. The method of claim 1, wherein the at least two subsystems comprise at least two independent, subsystems, each having an input and an output coupled with the communications channel, and wherein the method further comprises implementing a dispatcher within the communications channel for receiving a request from a requestor and transparently forwarding the request in parallel as the common request to each subsystem of the at least two subsystems.

5. The method of claim 1, further comprising associating an operation identifier with the common request and wherein the receiving (i) comprises receiving the operation identifier with the first response from the first subsystem and the receiving (iii) comprises receiving the operation identifier with the second response from the second subsystem, wherein the comparing employs the operation identifier in identifying the first checksum and the second checksum for the comparing, wherein a plurality of common requests and associated operation identifiers are forwarded to each subsystem of the at least two subsystems.

6. The method of claim 1, further comprising sending an error message from the communications channel to a requestor initiating the common request if the comparing identifies a mismatch between the first checksum and the second checksum.

7. The method of claim 1, wherein the at least two subsystems are asynchronous and each subsystem of the at least two subsystems comprises an independent, non-error-free subsystem capable of outputting untrusted responses, and wherein the method further comprises transparently implementing the receiving (i), determining (ii), receiving (iii), determining (iv), associating (v), and comparing (vi) in the communications channel between a host initiating a request and the at least two subsystems.

8. The method of claim 1, wherein the communications channel is coupled to at least three subsystems which output responses to the communications channel, and wherein the method further comprises discarding the first response after calculating the first checksum and discarding the second response after the comparing (vi) if the comparing identifies a mismatch between the first checksum and the second checksum, and wherein the method further comprises saving the first checksum along with an operation identifier of the common request and a subsystem ID of the first subsystem, and saving the second checksum and the operation ID of the common request and the subsystem ID of the second subsystem in temporary storage of the communications channel and awaiting receipt of a third response at the communications channel from a third subsystem responsive to the common request.

9. The method of claim 8, further comprising receiving the third response at the communications channel and determining a third checksum for the third response of the third subsystem, and if the third checksum matches the first checksum and the second checksum, discarding the third response, otherwise determining whether the first checksum, second checksum and third checksum are all mismatching, and if so, sending an error message to a requestor initiating the common request that at least two subsystems of the three subsystems are failing, and if two checksums of the first checksum, second checksum and third checksum match, sending a warning to the requestor with a failing subsystem identifier corresponding to the subsystem ID that returned the non-matching checksum.

10. The method of claim 9, further comprising determining whether the response to the common request had been forwarded, and if not, sending the third response to the requestor as the response to the common request, otherwise, discarding the third response at the communications channel.

* * * * *